(12) United States Patent
Kuehne

(10) Patent No.: US 10,497,181 B1
(45) Date of Patent: Dec. 3, 2019

(54) METHOD FOR OPERATING A VIRTUAL REALITY SYSTEM, AND VIRTUAL REALITY SYSTEM

(71) Applicant: AUDI AG, Ingolstadt (DE)

(72) Inventor: Marcus Kuehne, Beilngries (DE)

(73) Assignee: AUDI AG, Ingolstadt (DE)

( * ) Notice: Subject to any disclaimer, the term of this patent is extended or adjusted under 35 U.S.C. 154(b) by 0 days.

(21) Appl. No.: 16/084,010

(22) PCT Filed: Feb. 9, 2017

(86) PCT No.: PCT/EP2017/052836
§ 371 (c)(1),
(2) Date: Sep. 11, 2018

(87) PCT Pub. No.: WO2017/157589
PCT Pub. Date: Sep. 21, 2017

(30) Foreign Application Priority Data

Mar. 12, 2016 (DE) .......................... 10 2016 003 074

(51) Int. Cl.
*G06T 19/00* (2011.01)
*G06K 9/00* (2006.01)
(Continued)

(52) U.S. Cl.
CPC ............ *G06T 19/006* (2013.01); *G06F 3/011* (2013.01); *G06F 16/5866* (2019.01);
(Continued)

(58) Field of Classification Search
CPC ....... G06T 19/006; G06T 7/70; H04N 13/344; G06F 16/5866; G06F 3/011; G06K 9/00671
See application file for complete search history.

(56) References Cited

U.S. PATENT DOCUMENTS 5,588,139 A 12/1996 Lanier et al.
6,611,242 B1 8/2003 Hongo et al.
(Continued)

FOREIGN PATENT DOCUMENTS

CN 101097499 1/2008
CN 103150407 6/2013
(Continued)

OTHER PUBLICATIONS

International Search Report for PCT/EP2017/052836 dated Apr. 28, 2017.
(Continued)

*Primary Examiner* — Chong Wu
(74) *Attorney, Agent, or Firm* — Staas & Halsey LLP

(57) ABSTRACT

A virtual object is displayed in a virtual environment by virtual reality glasses placed on a first person. A configuration menu is overlaid on the virtual object by the virtual reality glasses, providing multiple configuration options for a specified functional group of the displayed virtual object, as soon as a second person activates a configuration mode on a controller selecting one of a plurality of overlaid configuration options according to a selection action carried out by the second person on the controller. The display of the virtual object is changed according to the selection that is carried out.

19 Claims, 2 Drawing Sheets

(51) Int. Cl.
*H04N 13/344* (2018.01)
*G06F 16/58* (2019.01)
*G06T 7/70* (2017.01)
*G06F 3/01* (2006.01)

(52) U.S. Cl.
CPC ............ *G06K 9/00671* (2013.01); *G06T 7/70* (2017.01); *H04N 13/344* (2018.05)

(56) References Cited

U.S. PATENT DOCUMENTS

| | | |
|---|---|---|
| 9,088,787 B1 | 7/2015 | Smith et al. |
| 2004/0143481 A1 | 7/2004 | Li |
| 2006/0170652 A1 | 8/2006 | Bannai et al. |
| 2006/0227151 A1 | 10/2006 | Bannai |
| 2007/0002037 A1 | 1/2007 | Kuroki et al. |
| 2007/0156540 A1 | 7/2007 | Koren et al. |
| 2013/0162632 A1* | 6/2013 | Varga .................. G06T 19/006 345/419 |
| 2015/0378156 A1 | 12/2015 | Kuehne |
| 2015/0378157 A1* | 12/2015 | Kuehne ................. G06F 3/011 345/8 |

FOREIGN PATENT DOCUMENTS

| | | |
|---|---|---|
| CN | 105393192 | 3/2016 |
| DE | 199 53 739 A1 | 7/2001 |
| DE | 10 2014 009 303 A1 | 12/2015 |
| DE | 10 2014 009 304 A1 | 12/2015 |
| DE | 10 2014 009 697 A1 | 12/2015 |
| DE | 102016003074.7 | 3/2016 |
| WO | 2011/025450 A1 | 3/2011 |
| WO | PCT/EP2017/052836 | 2/2017 |

OTHER PUBLICATIONS

Office Action for German Application No. 102016003074.7 dated Dec. 16, 2016.
Office Action dated Apr. 12, 2019 in corresponding Chinese Patent Application No. 201780016539.8 (8 pages).
English Translation by WIPO dated Sep. 13, 2018 of the International Preliminary Report on Patentability in corresponding International Patent Application No. PCT/EP2017/052836.
Office Action dated Sep. 17, 2019 in corresponding Chinese Patent Application No. 201780016539.8.

* cited by examiner

METHOD FOR OPERATING A VIRTUAL REALITY SYSTEM, AND VIRTUAL REALITY SYSTEM

CROSS REFERENCE TO RELATED APPLICATIONS

This application is the U.S. national stage of International Application No. PCT/EP2017/052836, filed Feb. 9, 2017 and claims the benefit thereof. The International Application claims the benefit of German Application No. 10 2016 003 074.7 filed on Mar. 12, 2016, both applications are incorporated by reference herein in their entirety.

BACKGROUND

Described below are a method for operating a virtual reality system and to a virtual reality system.

A virtual reality system can be used to depict a virtual reality, virtual reality usually referring to the depiction and simultaneous perception of the physical properties of reality in interactive virtual surroundings computer-generated in real time.

Virtual reality systems can have virtual reality goggles for displaying virtual surroundings. Virtual reality goggles are a particular form of what is known as a head mounted display, which is a visual output device worn on the head. The output device presents images on a near-to-eye screen or projects them directly onto the retina. In this case, virtual reality goggles additionally have sensors for detecting the movement of the head. It is thus possible for the display of computed graphics to be matched to the movements of a wearer of the virtual reality goggles. The physical proximity means that the displayed image areas of head mounted displays appear much larger than those of free standing screens and, in extreme cases, even cover the entire field of vision of the user. Since respective displays of virtual reality goggles follow all the head movements of a wearer by virtue of the head position, the wearer gets the feeling that he is moving directly in an image landscape generated by a computer.

In particular modern motor vehicles often have a multiplicity of different equipment options, meaning that customer-individual configuration can be very complex and difficult.

SUMMARY

Described below is a method for operating a virtual reality system and a virtual reality system by which a product can be configured virtually in a particularly simple manner.

The method for operating a virtual reality system involves a virtual object arranged in virtual surroundings being displayed by virtual reality goggles put on by a first person. A configuration menu, comprising multiple equipment options, for a prescribed group of functions of the displayed virtual object is shown by the virtual reality goggles as soon as a second person activates a configuration mode of a control device. One of the shown equipment options is selected in accordance with a selection action performed by the second person on the control device, and the depiction of the virtual object is changed in accordance with the selection made.

By the method described herein, it is thus possible for a person to be able to have the virtual reality goggles put on continually during a configuration process for the displayed virtual object. The second person can, whenever necessary, have a perfectly fitting configuration menu shown by the virtual reality goggles for respective groups of functions of the displayed virtual object. The first person, who has put on the virtual reality goggles, can then see which equipment options are available for the relevant group of functions. The configuration menu displayed by the virtual reality goggles likewise may be displayed by a display device connected to the control device, specifically such that the second person can likewise view the configuration menu. The wearer of the virtual reality goggles and the further person can then talk about which equipment option will be selected for the relevant group of functions, for example. As soon as the second and first persons have agreed, the second person can use the control device to make an applicable selection, as a result of which the relevant equipment option is selected. Subsequently, the depiction of the virtual object is adapted in accordance with the selection made.

The method is thus used to allow a selection window, in the form of the configuration menu, assisting a configuration process to be shown selectively. In this case, the configuration menu is shown within the already displayed virtual surroundings by the virtual reality goggles. By way of example, the control device may be a tablet computer or a personal computer used by the second person during the configuration process. The second person thus controls the showing of the configuration menu and the selection of the relevant equipment options during the method. By way of example, the method can be used in a sales conversation in which the first person has put on the virtual reality goggles, the second person being able to be a vendor, for example. The vendor can have the configuration menu shown within the already displayed virtual surroundings by the virtual reality goggles at a suitable moment, so that the customer, that is to say the first person, can see the configuration menu, so that the customer is assisted in the selection of one of the available equipment options by the showing of the configuration menu. A potential purchaser, that is to say the first person, who has put on the virtual reality goggles, and a vendor, that is to say the second person, can thus configure the displayed virtual object, which may be a virtual motor vehicle, for example, in a particularly simple manner together in a particularly simple and convenient manner.

An advantageous embodiment provides for the group of functions for which the configuration menu is shown to be prescribed in accordance with an input made by the second person on the control device. If the virtual object is a virtual motor vehicle, for example, then the second person can use the control device to determine the group of functions of the virtual motor vehicle for which an applicable configuration menu having respective equipment options will currently be shown. The second person may see the virtual perspective from which the first person is currently looking at the virtual object with the virtual reality goggles. In accordance with the virtual perspective of the first person, the second person can use an applicable input on the control device to select that group of functions of the virtual motor vehicle, for example the rims, the bodywork or the like, for which the applicable configuration menu will be shown within the already displayed virtual surroundings. As such, the second person can guide the first person through the configuration of the virtual object step by step.

A further advantageous embodiment provides for the group of functions or at least a component of the object that belongs to the group of functions to be visually highlighted as soon as the configuration menu for the group of functions is shown. As a result, the first person can directly see, in a simple manner, that group of functions of the virtual object for which the configuration menu has just been shown. This facilitates the configuration process considerably.

According to a further advantageous embodiment, there is provision for a selection symbol by which the selected equipment option is visually marked to be displayed within the shown configuration menu. By way of example, the selection symbol can be shown in the form of a rectangle, so that the wearer of the virtual reality goggles, that is to say the first person, can directly see, in a simple manner, which of the available equipment options have just been selected by the second person. This considerably facilitates the communication between the first and second persons during the configuration of the virtual object.

In a further advantageous configuration, there is provision for the depiction of the virtual object not to be changed until the selection of the equipment option has been confirmed by the second person on the control device. The depiction of the virtual object thus may not be directly adapted with the selection of one of the shown equipment options, but instead there is provision for the depiction of the virtual object not to be changed until the selection of the equipment option has additionally been confirmed on the control device by the second person. The first and second persons can thus calmly first of all talk about which of the displayed selection options should actually be selected. Moreover, there is also the possibility of various equipment options being selected first of all and deselected again. As a result of the final selection of the relevant equipment option first needing to be confirmed by the second person before the depiction of the displayed virtual object is adapted as appropriate, the wearer of the virtual reality goggles, that is to say the first person, is not distracted during the selection process by constant changing of the depiction of the virtual object.

A further advantageous embodiment provides for respective information windows to be displayed for the shown equipment options, in particular if the second person inputs an applicable control command on the control device. Further, there may also be provision for a respective information window with supplementary information for the relevant equipment option to be displayed for the currently selected equipment option. As a result, the first person can be provided with relevant information for the configuration of the virtual object with regard to the currently selected equipment option. This facilitates the configuration process for the virtual object.

According to a further advantageous embodiment, there is provision for the configuration menu to be shown such that a virtual distance within the virtual surroundings between the configuration menu and a virtual observation position of the first person is chosen to be all the shorter the shorter the distance between the virtual observation position and the group of functions for which the configuration menu is shown. If the first person is sitting in a virtual motor vehicle, for example, the configuration menu is shown virtually somewhat closer to the first person than if he should be outside the virtual motor vehicle, for example, and therefore looks at the virtual motor vehicle from the outside. the virtual distance may be limited to a prescribed extent, however. Thus, should the first person move virtually very far away from the displayed virtual object, the configuration menu is displayed virtually no further away from the first person than the prescribed extent is set, however. In particular, the configuration menu is shown such that the equipment options are still easily readable and viewable by the first person.

A further advantageous embodiment provides for that portion of the virtual surroundings and/or of the virtual object that is covered by the shown configuration menu to be hidden. This can prevent a visual conflict from arising, for example because the shown configuration menu is partly in the displayed virtual object.

The virtual reality system has virtual reality goggles and a control device or controller that is designed to actuate the virtual reality goggles to perform the method or an advantageous embodiment of the method. Advantageous configurations of the method described herein can be regarded as advantageous configurations of the virtual reality system in this case, the virtual reality system performing the method.

BRIEF DESCRIPTION OF THE DRAWINGS

Further advantages, features and details will become more apparent and more readily appreciated from the description below of an exemplary embodiment and with reference to the drawings. The features and combinations of features cited in the description above and the features and combinations of features cited in the description of the figures below and/or shown in the figures alone can be used not only in the respectively indicated combination but also in other combinations or on their own without departing from the scope of the invention. The accompanying drawings are.

DETAILED DESCRIPTION OF THE PREFERRED EMBODIMENT

Figure 1:
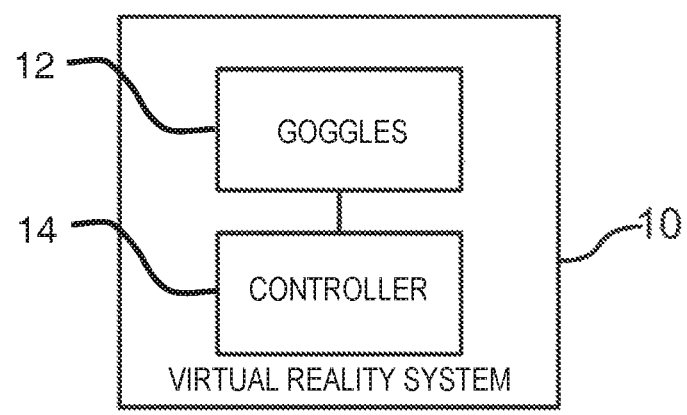
FIG. 1, a schematic block diagram of a virtual reality system comprising virtual reality goggles and a control device for actuating the virtual reality goggles.

A virtual reality system 10 having virtual reality goggles 12 and a control device 14 for actuating the virtual reality goggles 12 is shown in a schematic depiction in FIG. 1. The virtual reality system 10 is used to configure a virtual object, in particular a virtual motor vehicle.

Figure 2:
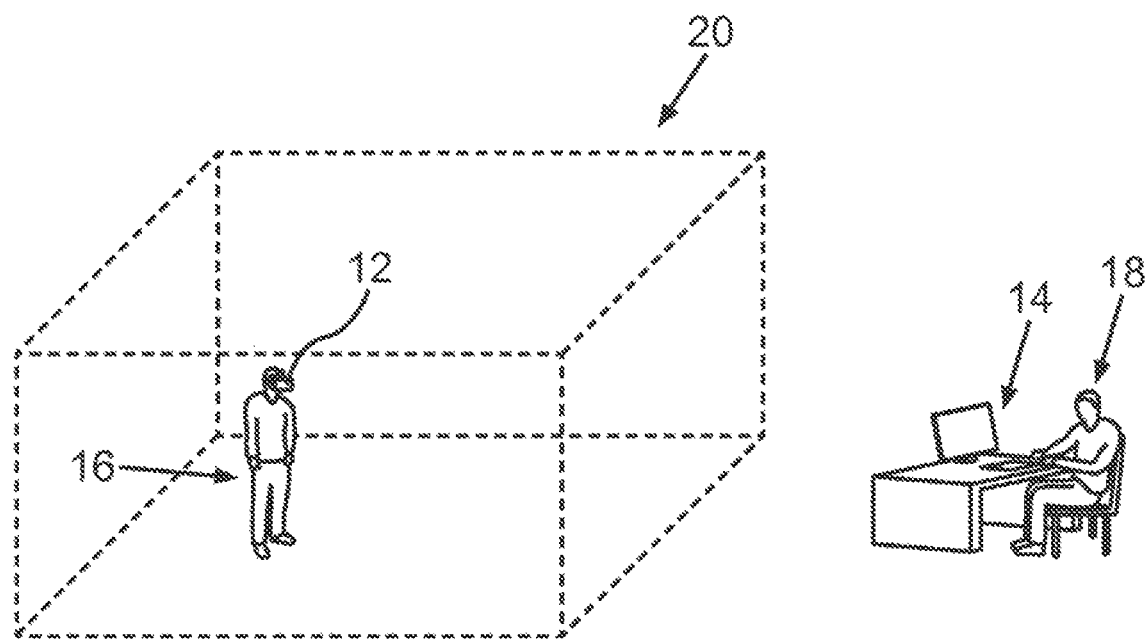
FIG. 2, a schematic perspective view of a first person who has put on the virtual reality goggles and a second person, sitting at a table, who operates the control device of the virtual reality system.

FIG. 2 schematically depicts a first person 16 and a second person 18, the first person 16 having put on the virtual reality goggles 12 and being in a capture space 20. The second person 18 operates the control device 14, which is a laptop in the example shown in the present case. Alternatively, the control device 14 may also be a tablet computer, a PC or the like, for example. The virtual reality system 10 can have a capture device, not depicted here, by which the position of the virtual reality goggles 12 can be captured continually, at least so long as the person 16 is within the capture space 20.

Figure 3:
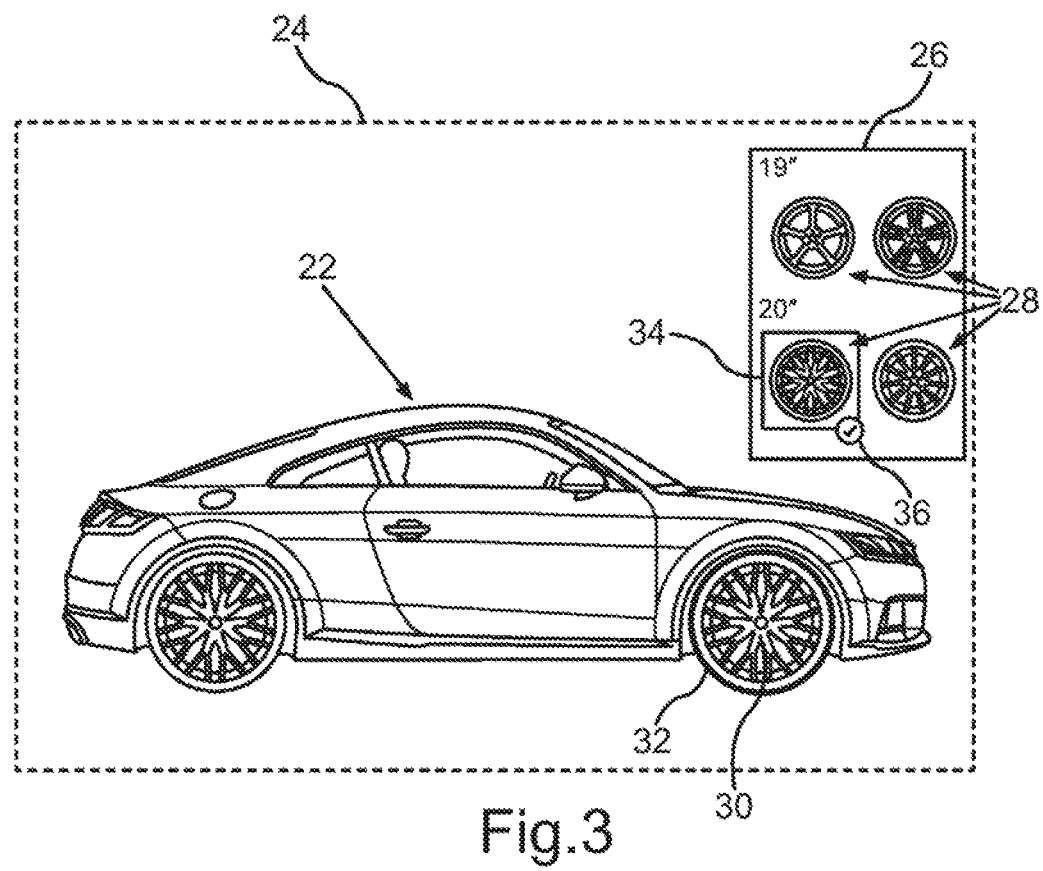
FIG. 3, a side view of a virtual motor vehicle, arranged in virtual surroundings, with inset rims for selection that is displayed by the virtual reality goggles.

FIG. 3 shows a virtual motor vehicle 22 arranged within virtual surroundings 24, such as a virtual showroom, for example. The virtual motor vehicle arranged within the virtual surroundings 24 is displayed by the virtual reality goggles 12, which have been put on by the first person 16. The second person 18, who is sitting at the table, assists the first person 16 in configuring the virtual motor vehicle 22. In the case shown here, the first person 16, who has put on the virtual reality goggles 12, is currently supposed to be deciding on a particular rim variant.

To this end, the second person 18 uses the control device 14 to activate a configuration mode. Beforehand, the second person 18 selects that a rim selection is supposed to be made, for example. As soon as the second person 18 has used the control device 14 to activate the configuration mode, a configuration menu 26 is shown within the virtual surroundings 24 displayed by the virtual reality goggles 12. As can be seen, the shown configuration menu 26 displays various rims 28, which are respective equipment options for the wheels 30 of the displayed virtual motor vehicle 22. As can be seen, the front right wheel 30 is visually highlighted by a marker 32 in the case shown here. The first person 16, who has put on the virtual reality goggles 12, can thus easily see that the shown configuration menu 26 belongs to the tires of the virtual motor vehicle 22 group of functions.

Also—as soon as the configuration menu 26 is shown—a selection symbol 34 may be displayed within the shown configuration menu 26. The second person 18 can use applicable control actions on the control device 14 to move the selection symbol 34, so that the various available equipment options in the form of the displayed rims 28 can be visually marked. The first person 16, who has put on the virtual reality goggles 12, and the second person 18, who performs the actual configuration action on the virtual motor vehicle 22, can thus communicate with one another in a simple and unequivocal manner about which of the equipment options, in the present case that is to say which of the rims 28, is supposed to be selected. The control device 14, in the present case that is to say the laptop, may be used to display the same configuration menu 26 as is shown within the virtual surroundings 24 by the virtual reality goggles 12.

As soon as the two people 16, 18 have agreed which of the rims 28 is now actually supposed to be selected, the second person 18 confirms the selection, as a result of which a confirmation symbol 36 may be displayed on the selection symbol. As soon as the selection has been confirmed by the second person 18, the depiction of the virtual motor vehicle 22 is adapted in accordance with the selection made and confirmed.

In particular, the second person 18 can use an applicable input on the control device 14 to prompt an information window, not depicted here, to be shown. By way of example, it is also possible for respective information windows to be shown for the various rims 28 if required, so that the first person 16 can be provided not only with the shown configuration menu 26 but also with information regarding the different rims 28 by the virtual reality goggles 12. This facilitates the communication between the two people 16, 18 during the configuration process for the virtual motor vehicle 22.

The configuration menu 26 is in this case always shown by the virtual reality goggles 12 such that the first person 16 can easily see the different equipment options 28. The virtual distance between the virtual observation position of the first person 16 and the shown configuration menu 26 may be dynamically adapted in this case. If the first person 16 is sitting inside the displayed virtual motor vehicle 22, for example, then the configuration menu 26 is displayed virtually closer by the virtual reality goggles 12 than if the first person 16 should look at the virtual motor vehicle 22 through the virtual reality goggles 12 from the outside.

Furthermore, there may be provision for that portion of the virtual surroundings 24 and/or the virtual motor vehicle 22 that is covered by the shown configuration menu 26 to be hidden. This serves in particular to avoid a visual conflict, for example if the configuration menu 26 serving as a selection window were to be practically partly in the displayed virtual motor vehicle 22.

The virtual reality system 10 explained is thus used to provide a particularly simple and convenient way of configuring a virtual product, for example in the form of the virtual motor vehicle 22.

A description has been provided with particular reference to preferred embodiments thereof and examples, but it will be understood that variations and modifications can be effected within the spirit and scope of the claims which may include the phrase "at least one of A, B and C" as an alternative expression that means one or more of A, B and C may be used, contrary to the holding in *Superguide v. DIRECTV*, 358 F3d 870, 69 USPQ2d 1865 (Fed. Cir. 2004).

The invention claimed is:

1. A method for operating a virtual reality system, comprising:
    displaying a virtual object, arranged in virtual surroundings, by virtual reality goggles worn by a first person;
    showing a configuration menu, having equipment options, for a prescribed group of functions of the virtual object by the virtual reality goggles as soon as a second person activates a configuration mode on a control device;
    selecting one of the equipment options in accordance with a selection action performed by the second person on the control device;
    changing depiction of the virtual object in accordance with the one of the equipment options selected; and
    visually highlighting the group of functions or at least a component of the virtual object belonging to the group of functions, as soon as the configuration menu for the group of functions is shown.

2. The method as claimed in claim 1, wherein the group of functions for which the configuration menu is shown is prescribed in accordance with an input made by the second person on the control device.

3. The method as claimed in claim 2, wherein a selection symbol by which the one of the equipment options selected is visually marked within the configuration menu.

4. The method as claimed in claim 3, wherein the depiction of the virtual object is not changed until selection of the one of the equipment options has been confirmed by the second person on the control device.

5. The method as claimed in claim 4, wherein the showing of the configuration menu includes displaying respective information windows for the equipment options when the second person inputs an applicable control command on the control device.

6. The method as claimed in claim 5, wherein the showing of the configuration menu includes a virtual distance within the virtual surroundings between the configuration menu and a virtual observation position of the first person that is reduced as a distance between the virtual observation position and the group of functions is reduced.

7. The method as claimed in claim 6, wherein the virtual distance is limited to a prescribed extent.

8. The method as claimed in claim 1, wherein the depiction of the virtual object is not changed until selection of the one of the equipment options has been confirmed by the second person on the control device.

9. The method as claimed in claim 1, wherein the showing of the configuration menu includes displaying respective information windows for the equipment options when the second person inputs an applicable control command on the control device.

10. The method as claimed in claim 1, wherein the showing of the configuration menu includes a virtual distance within the virtual surroundings between the configuration menu and a virtual observation position of the first person that is reduced as a distance between the virtual observation position and the group of functions is reduced.

11. A virtual reality system used by first and second persons, comprising
    virtual reality goggles, worn by the first person, producing a display including a virtual object arranged in virtual surroundings; and
    a control device, coupled to and controlling the display produced by the virtual reality goggles, configured to perform a method including
        receiving an activation command of a configuration mode from the second person,
        generating, in the display of the virtual reality goggles upon receipt of the activation command for the configuration mode, a configuration menu having equipment options for a prescribed group of functions of the virtual object with at least one of a component of the virtual object, belonging to the group of functions, and the group of functions being visually highlighted as the configuration menu is displayed,
        detecting a selection action by the second person,
        selecting one of the equipment options in accordance with the selection action,
        changing depiction of the virtual object in accordance with the one of the equipment options selected.

12. The virtual reality system as claimed in claim 11, wherein the method further includes
    receiving an input from the second person, and
    prescribing the group of functions in accordance with the input by the second person.

13. The virtual reality system as claimed in claim 12, wherein the method further includes generating in the display of the virtual reality goggles, a selection symbol visually marking the one of the equipment options within the configuration menu.

14. The virtual reality system as claimed in claim 13,
    wherein the method further includes confirming selection of the one of the equipment options by the second person, and
    wherein the changing of the depiction of the virtual object occurs after the selection of the one of the equipment options has been confirmed by the second person.

15. The virtual reality system as claimed in claim 14,
    wherein the method further includes receiving a configuration control command from the second person, and
    wherein the generating of the configuration menu includes displaying respective information windows for the equipment options when the second person inputs the configuration control command.

16. The virtual reality system as claimed in claim 15, wherein the generating of the configuration menu includes a virtual distance within the virtual surroundings between the configuration menu and a virtual observation position of the first person that is reduced as a distance between the virtual observation position and the group of functions is reduced.

17. The virtual reality system as claimed in claim 16, wherein the virtual distance is limited to a prescribed extent.

18. The virtual reality system as claimed in claim 11,
    wherein the method further includes confirming selection of the one of the equipment options by the second person, and
    wherein the changing of the depiction of the virtual object occurs after the selection of the one of the equipment options has been confirmed by the second person.

19. The virtual reality system as claimed in claim 11,
    wherein the method further includes receiving a configuration control command from the second person, and
    wherein the generating of the configuration menu includes displaying respective information windows for the equipment options when the second person inputs the configuration control command.

* * * * *